(12) United States Patent
Lee

(10) Patent No.: US 7,246,992 B2
(45) Date of Patent: Jul. 24, 2007

(54) HIGH EFFICIENCY FAN COOLING HOLES FOR TURBINE AIRFOIL

(75) Inventor: Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 11/046,112

(22) Filed: Jan. 28, 2005

(65) Prior Publication Data

US 2006/0171807 A1    Aug. 3, 2006

(51) Int. Cl.
*F01D 5/18* (2006.01)
(52) U.S. Cl. .................... 415/115; 416/96 R; 416/97 R
(58) Field of Classification Search .............. 415/115, 415/116; 416/96 R, 96 A, 97 A, 97 R
See application file for complete search history.

(56) References Cited

U.S. PATENT DOCUMENTS

| | | | |
|---|---|---|---|
| 4,922,076 A | 5/1990 | Cross et al. | |
| 5,382,133 A | 1/1995 | Moore et al. | |
| 5,486,093 A | 1/1996 | Auxier et al. | |
| 5,683,600 A | 11/1997 | Kelley et al. | |
| 5,779,437 A | 7/1998 | Abdel-Messeh et al. | |
| 6,183,199 B1 | 2/2001 | Beeck et al. | |
| 6,287,075 B1 | 9/2001 | Kercher | |
| 6,869,268 B2 * | 3/2005 | Liang | 415/115 |
| 6,979,176 B2 * | 12/2005 | Nakamata et al. | 416/97 R |
| 2004/0047724 A1 | 3/2004 | Liang | |

FOREIGN PATENT DOCUMENTS

| | | |
|---|---|---|
| EP | 0985802 A1 | 3/2000 |
| EP | 1609949 A1 | 12/2005 |
| EP | 1645721 A2 | 12/2006 |

* cited by examiner

*Primary Examiner*—Edward K. Look
*Assistant Examiner*—Dwayne J White
(74) *Attorney, Agent, or Firm*—Adams Evans P.A.; David L. Narciso, Esq.

(57) ABSTRACT

A turbine airfoil includes a leading edge and an axially spaced-part trailing edge, the leading edge having an axially-extending external surface curvature. A cooling circuit in the airfoil includes cooling holes formed in the leading edge along the span axis of the airfoil. The cooling holes have a diffuser section communicating with the leading edge surface. The diffuser section has four opposed walls defining a generally quadralinear exit opening on the surface of the leading edge. One of the diffuser walls has a convex curvature that approximates the external surface curvature of the leading edge whereby fluid flow from the cooling hole exits is evenly dispersed and spread along land portions of the leading edge adjacent the cooling holes.

24 Claims, 7 Drawing Sheets

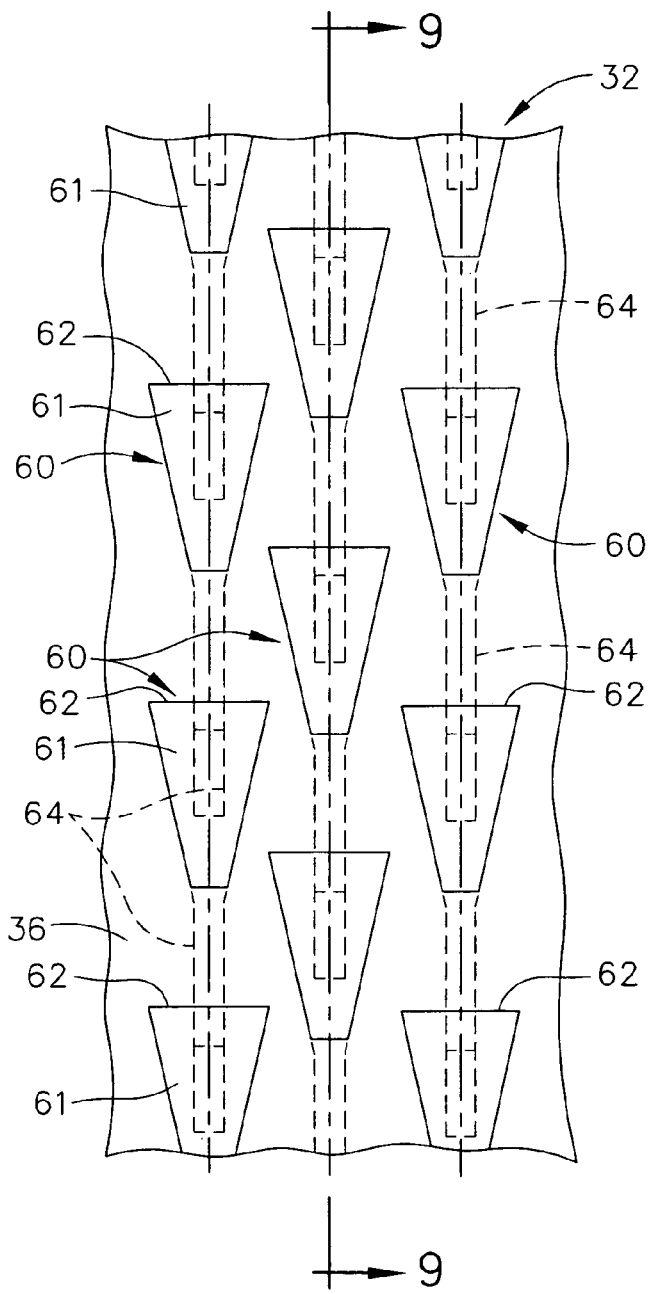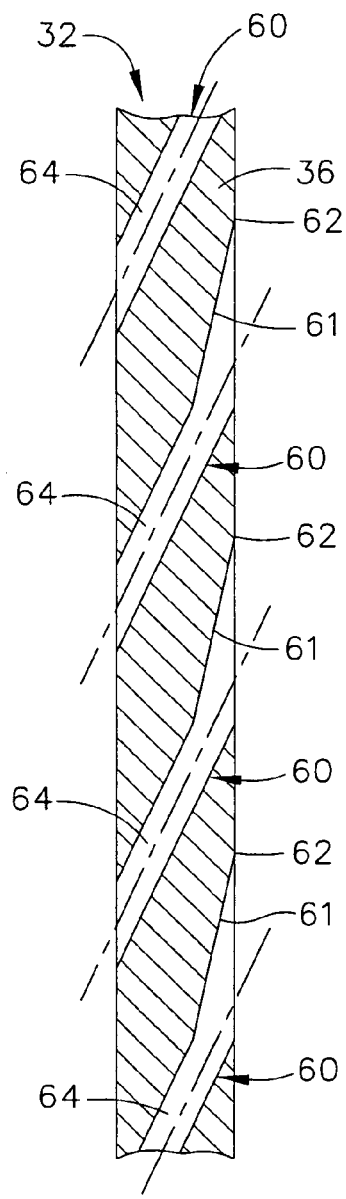
FIG. 8
FIG. 9

HIGH EFFICIENCY FAN COOLING HOLES FOR TURBINE AIRFOIL

TECHNICAL FIELD AND BACKGROUND OF THE INVENTION

This invention relates to a turbine airfoil that includes high efficiency cooling holes in the leading edge. In a gas turbine engine, air is compressed in a compressor, mixed with fuel and ignited in a combustor for generating hot combustion gases which flow downstream through one or more stages of turbine nozzles and blades. The nozzles include stationary vanes followed in turn by a corresponding row of turbine rotor blades attached to the perimeter of a rotating disk. The vanes and blades have correspondingly configured airfoils which are hollow and include various cooling circuits and features which receive a portion of air bled from the compressor for providing cooling against the heat from the combustion gases.

The turbine vane and blade cooling art discloses various configurations for enhancing cooling and reducing the required amount of cooling air in order to increase the overall efficiency of the engine while obtaining a suitable useful life for the vanes and blades. For example, typical vane and blade airfoils in the high pressure turbine section of the engine include cooling holes that extend through the pressure side, or suction side, or both, for discharging a film of cooling air along the outer surface of the airfoil to effect film cooling in a conventional manner.

A typical film cooling hole is in the form of a cylindrical aperture inclined axially through one of the airfoil sides, such as the pressure side, for discharging the film air in the aft direction. The cooling holes are typically provided in a radial or spanwise row of holes at a specific pitch spacing. In this way, the cooling holes discharge a cooling film that forms an air blanket for protecting the outer surface, otherwise known as "lands" of the airfoil from hot combustion gases during operation.

In the region of the blade leading edge, it is also known to incline the cylindrical film cooling holes at an acute span angle to position the hole outlets radially above the hole inlets and discharge the cooling film radially outwardly from the respective holes. In order to improve the performance of cooling holes, it is also conventional to modify their shape to effect cooling flow diffusion. The diffusion reduces the discharge velocity and increases the static pressure of the airflow. Diffusion cooling holes are found in patented configurations for improving film cooling effectiveness with suitable blowing ratios and backflow margin. A typical diffusion film cooling hole may be conical from inlet to outlet with a suitable increasing area ratio for effecting diffusion without undesirable flow separation. Diffusion occurs in three axes, i.e. along the length of the hole and in two in-plane perpendicular orthogonal axes. See, for example, U.S. Pat. No. 6,287,075 to the present assignee.

Other types of diffusion cooling holes are also found in the prior art including various rectangular-shaped holes, and holes having one or more squared sides in order to provide varying performance characteristics. Like conical diffusion holes, the rectangular diffusion holes also effect diffusion in three dimensions as the cooling air flows therethrough and is discharged along the outer surface of the airfoil. See, for example, U.S. Pat. Nos. 6,283,199, 5,683,600 and 5,486,093.

As indicated above, the various diffusion cooling holes are typically arranged in rows extending along the span or radial axis of the airfoil, and are positioned as closely together as space permits for collectively discharging film cooling air. Since adequate spacing must be provided between the adjacent cooling holes for maintaining suitable strength, the discharge film cooling air does not provide 100% coverage along the span line of the corresponding row of holes.

A typical prior art hole pitch spacing is ten diameters of the circular hole inlet. In the example of the spanwise inclined cylindrical cooling holes described above, a typical span angle is about 30 degrees, with a 0.25 mm hole diameter. The effective coverage of the row of fan cooling holes may be defined by a coverage parameter represented by the span height of the cooling hole along the airfoil outer surface divided by the pitch spacing of adjacent holes. For an inclined cylindrical hole, the outer surface span height of the hole may be the diameter of the hole divided by the sine of the inclination angle. This results in a 20% coverage value for 30 degree inclined cylindrical holes at a ten diameter spacing.

This coverage is significantly improved by the use of conical diffusion holes. A typical prior art airfoil may have 0.25 mm circular inlets increasing in area to circular outlets having a diameter of about 0.46 mm, with the same centerline spanwise hole spacing or pitch of ten inlet diameters. The corresponding coverage value is 36%, which is an improvement over the simple cylindrical holes.

However, it is desired to further improve film cooling by more evenly diffusing the cooling film along the airfoil, particularly in the area of the leading edge.

SUMMARY OF THE INVENTION

In accordance with one aspect of the invention, a turbine airfoil is provided that includes a leading edge and an axially spaced-part trailing edge, the leading edge having an axially-extending aerodynamic external surface curvature. A root and a tip are spaced-apart along a span axis, and a pressure sidewall and a laterally-spaced suction sidewall extend between the leading and trailing edges. A cooling circuit is formed between the pressure sidewall and the suction sidewall for channeling a fluid flow through the cooling circuit for cooling the airfoil. The cooling circuit includes a plurality of cooling holes formed in the leading edge along the span axis of the airfoil. At least some of the cooling holes have a diffuser section communicating with the leading edge surface. The diffuser section has four opposed walls defining a generally quadralinear exit opening on the surface of the leading edge. At least one of the diffuser walls has a convex curvature that approximates the external surface curvature of the leading edge. Fluid flow from the cooling hole exit is more evenly dispersed and spread along land portions of the leading edge adjacent the cooling holes.

BRIEF DESCRIPTION OF THE DRAWINGS

Further aspects of the invention will appear when taken in conjunction with the following drawings, in which:

FIG. 8 is an straightened cross-section of the leading edge portion of the airfoil shown in FIG. 5; and FIG. 9 is a vertical cross-section taken along line 9—9 of FIG. 8.

DESCRIPTION OF THE PREFERRED EMBODIMENT AND BEST MODE

Figure 1:
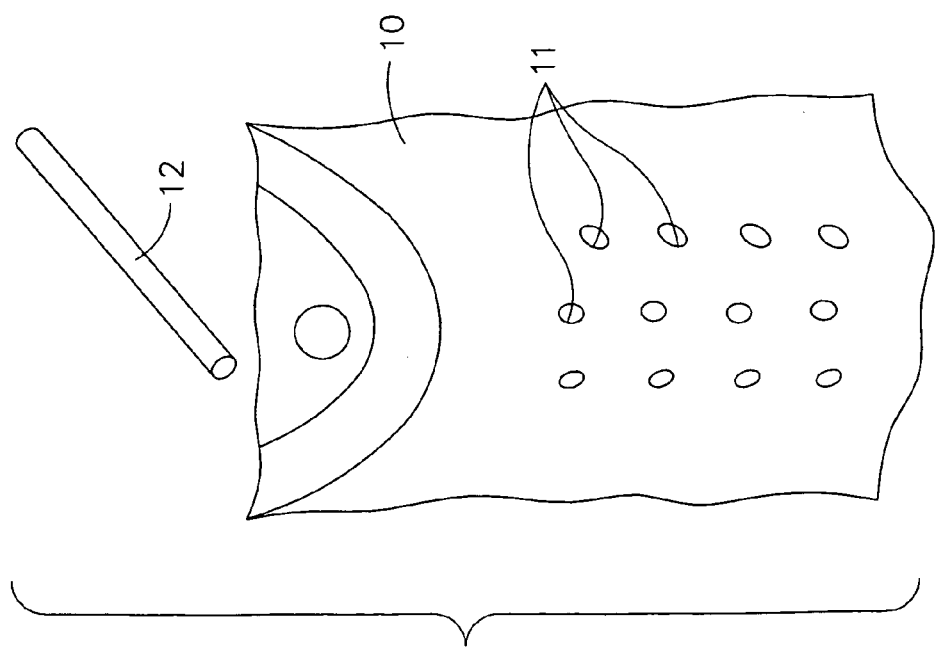

Referring now specifically to the drawings, examples of prior art airfoils with leading edge cooling holes are shown in FIGS. 1–4. FIG. 1 shows an airfoil leading edge 10 having conventional, cylindrical cooling holes 11 formed therein, and the electrical discharge machining ("EDM") tool 12 used to form the holes 11. As will be noted, these holes 11 have a cylindrical inner wall that forms an endless wall surface.

Figure 2:
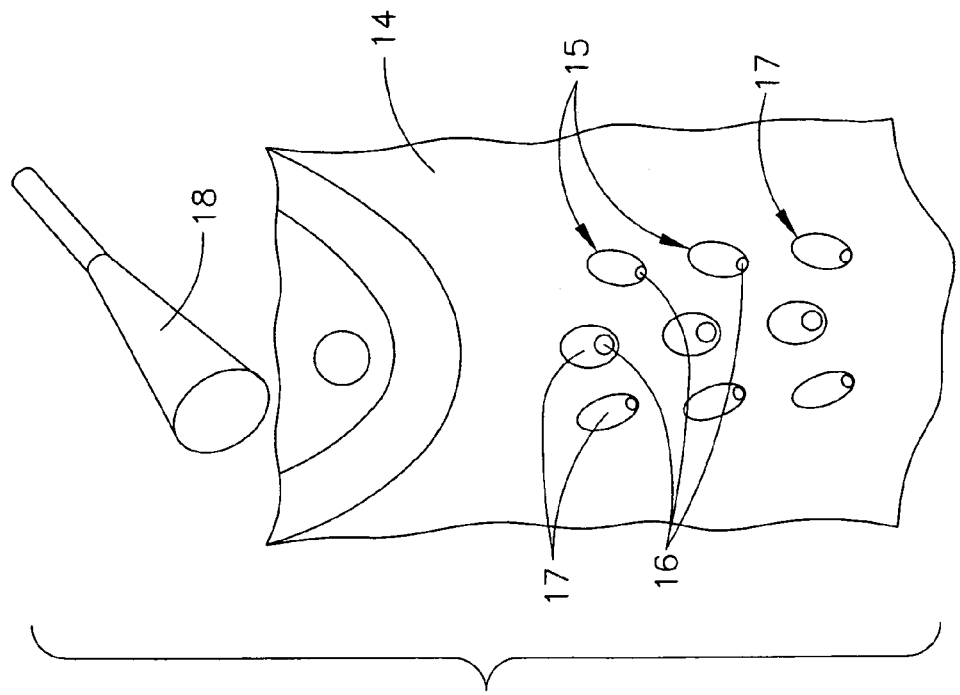
FIGS. 1–4 illustrate prior art airfoil cooling hole designs.

FIG. 2 shows an airfoil leading edge 14 having conventional cooling holes 15. The holes 15 include a cylindrical metering section 16 and a conical diffuser section 17 that communicates with the holes 15 in the surface of the leading edge 14. As with the holes 11 in the leading edge 10 of FIG. 1, the diffuser section 17 has an inner wall that forms an endless wall surface. The EDM tool 18 is used to form the holes 11.

Figure 3:
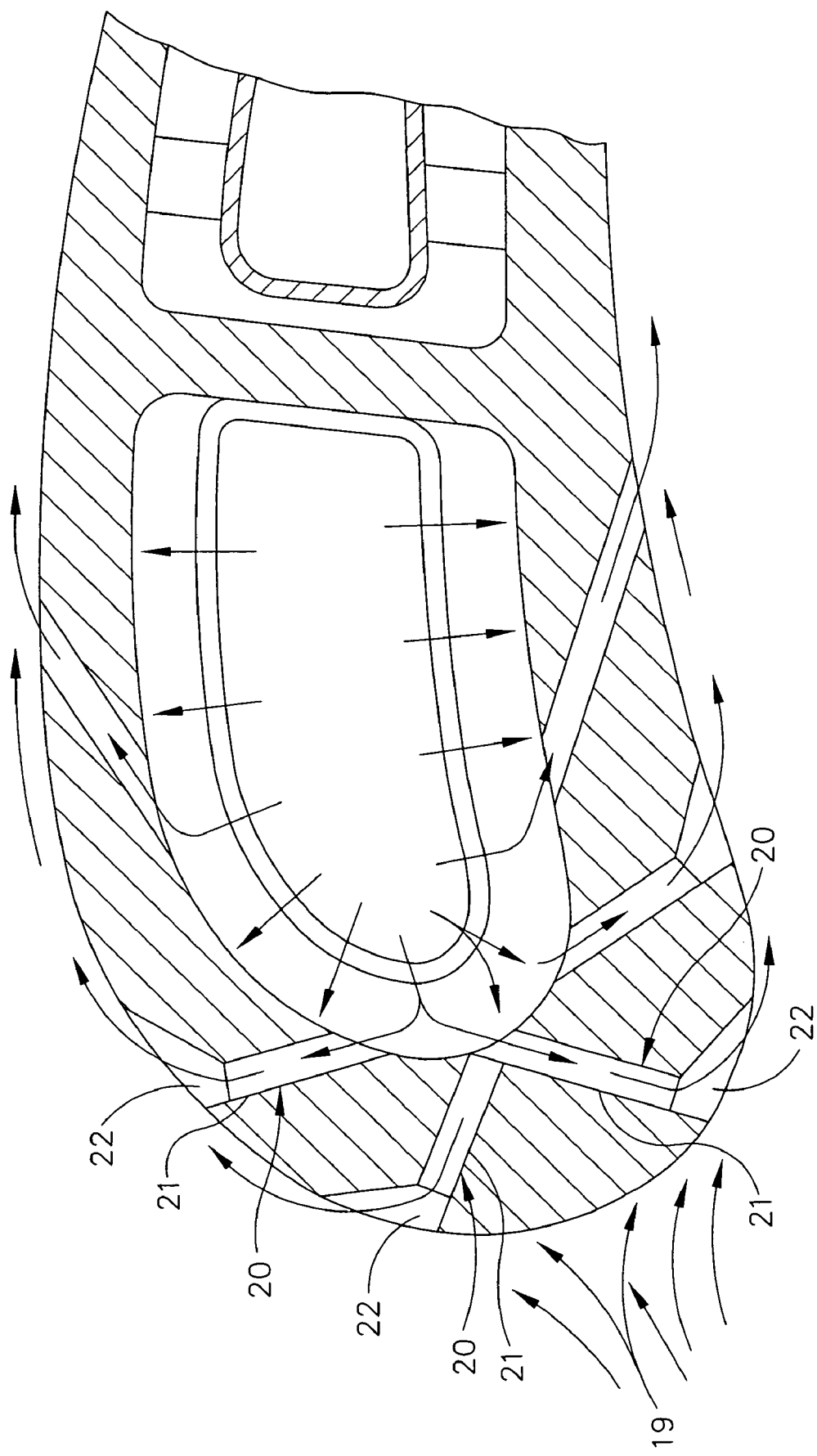
Figure 4:
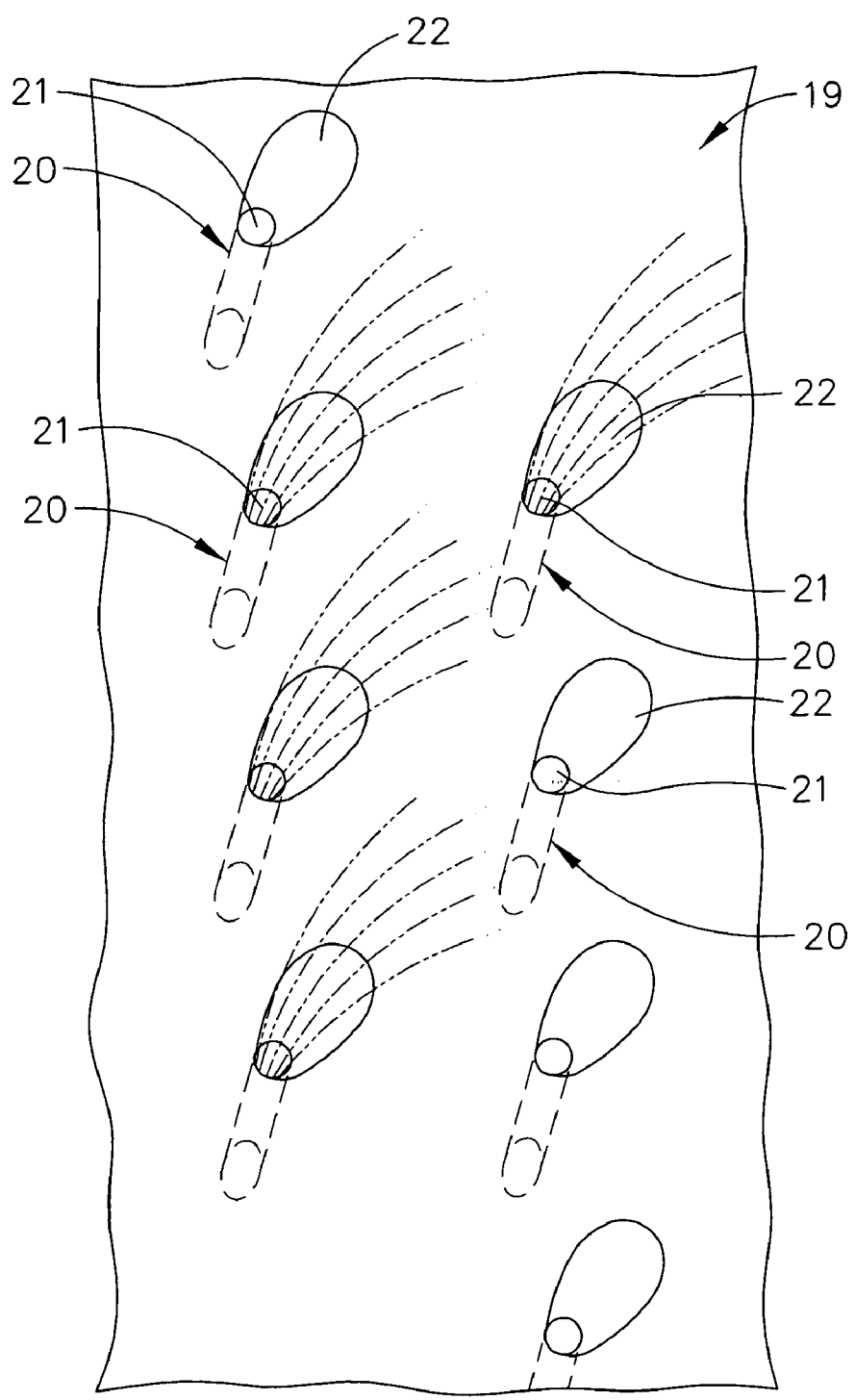

FIGS. 3 and 4 illustrate another prior art cooling hole design exemplified in U.S. Pat. No. 5,779,437. An airfoil leading edge 19 includes cooling holes 20. Each cooling hole 20 includes a cylindrical, straight metering section 21 having a predetermined centerline axis, and a diffuser section 22 having a centerline axis that is acutely divergent to the metering section 21.

Figure 5:
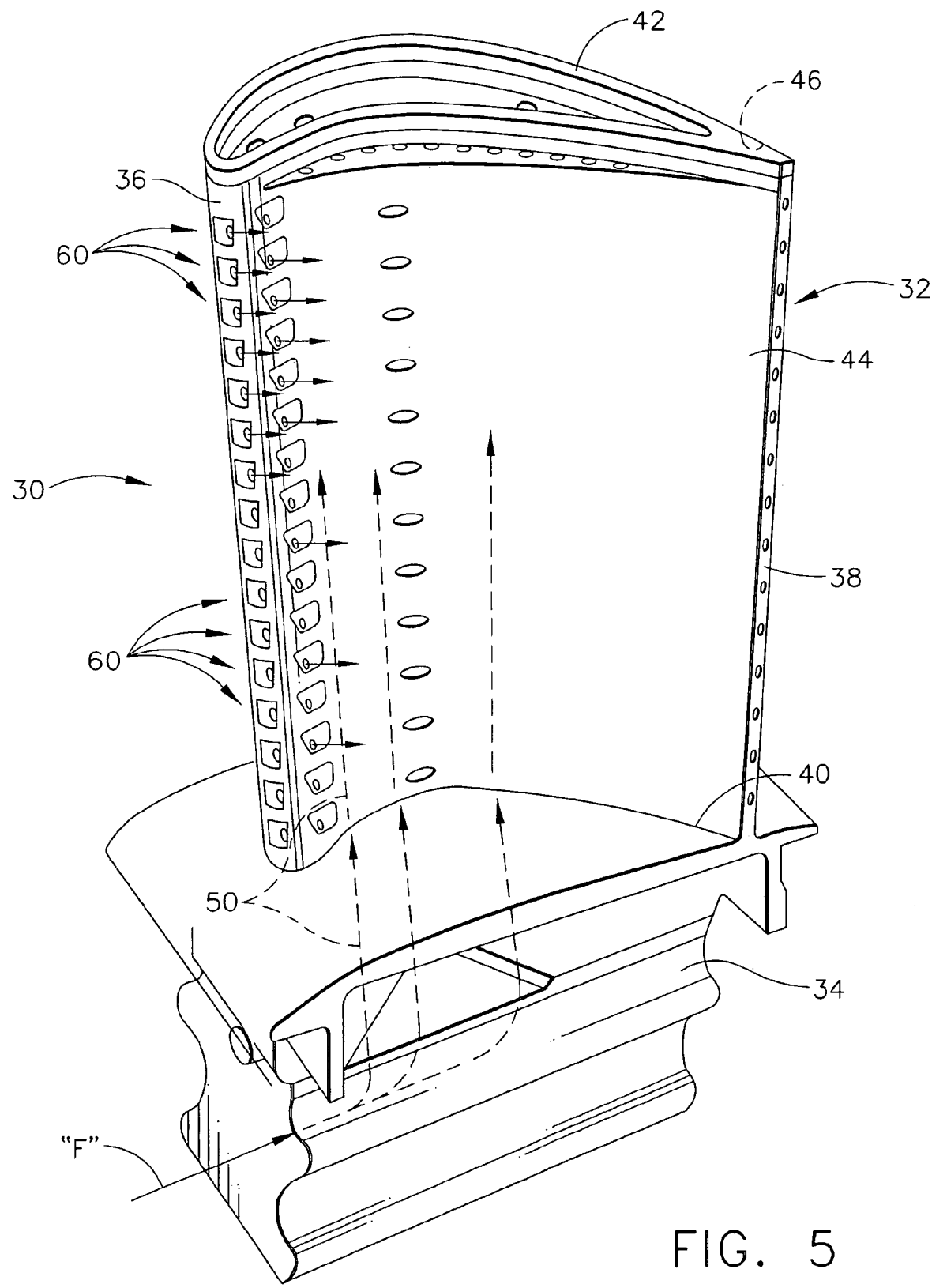
FIG. 5 is a perspective view of a gas turbine engine rotor blade including cooling holes in accordance with an embodiment of the invention.

Referring now to FIG. 5, a turbine rotor blade 30 in accordance with an exemplary embodiment of the present invention is shown. The blade 30 includes an airfoil 32 having an integral dovetail 34 at a radially inner end for mounting the blade 30 to the perimeter of a rotor disk, not shown, in an annular row of such blades 30 in a conventional manner. In the exemplary embodiment illustrated in FIG. 5, the blade 30 is a first stage high pressure turbine rotor blade disposed immediately downstream of a high pressure turbine nozzle (not shown) which receives hot combustion gases from a combustor of a gas turbine engine (not shown) in a conventional manner. The airfoil 32 and dovetail 34 are suitably hollow for receiving a cooling fluid "F" such as a portion of compressed air bled from a compressor of the engine (not shown), for cooling the blade 30 during operation against the heat from the combustion gases.

The airfoil 32 includes a leading edge 36 and an opposite trailing edge 38. The airfoil 32 also includes a root 40 at a platform portion of the dovetail 34, and an opposite tip 42 spaced radially-apart along a generally radially-extending span axis.

The airfoil 32 also includes a pressure sidewall 44 that is generally concave and an opposite, suction sidewall 46 that is generally convex and is spaced-apart from the pressure sidewall 44. The pressure sidewall 44 and suction sidewall 46 extend from leading edge 36 to trailing edge 38, and root 40 to tip 42, respectively.

Airfoil 32 as well as the dovetail 34 includes a cooling circuit or channel 50 disposed between the airfoil sides 44 and 46 for channeling the cooling fluid "F" through the airfoil for providing cooling during operation. The cooling circuit 50 may take any conventional form including various channels extending through the airfoil 32, such as along the leading edge 36, along the trailing edge 38, and along the mid-chord area in the form of a suitable serpentine fluid path. In the airfoil 32 shown in FIG. 5, the cooling fluid "F" is channeled from the engine compressor and through suitable apertures between the blade dovetail 34 and its respective axial dovetail slot in the disk in any conventional manner.

Although the specific airfoil 32 is shown as a portion of the turbine rotor blade 30, the invention applies as well to any form of airfoil such as those also found in the stationary turbine nozzle (not shown).

In accordance with one exemplary embodiment of the present invention, a plurality of leading edge diffusion cooling holes 60 are spaced-apart along the leading edge 36 in three rows for discharging the cooling fluid "F" from the cooling circuit 50 inside the airfoil 32 along its outer surface to provide a cooling film of fluid onto the surface of the airfoil, particularly in the area of the leading edge 36 and areas immediately aft of the leading edge 36.

Figure 6:
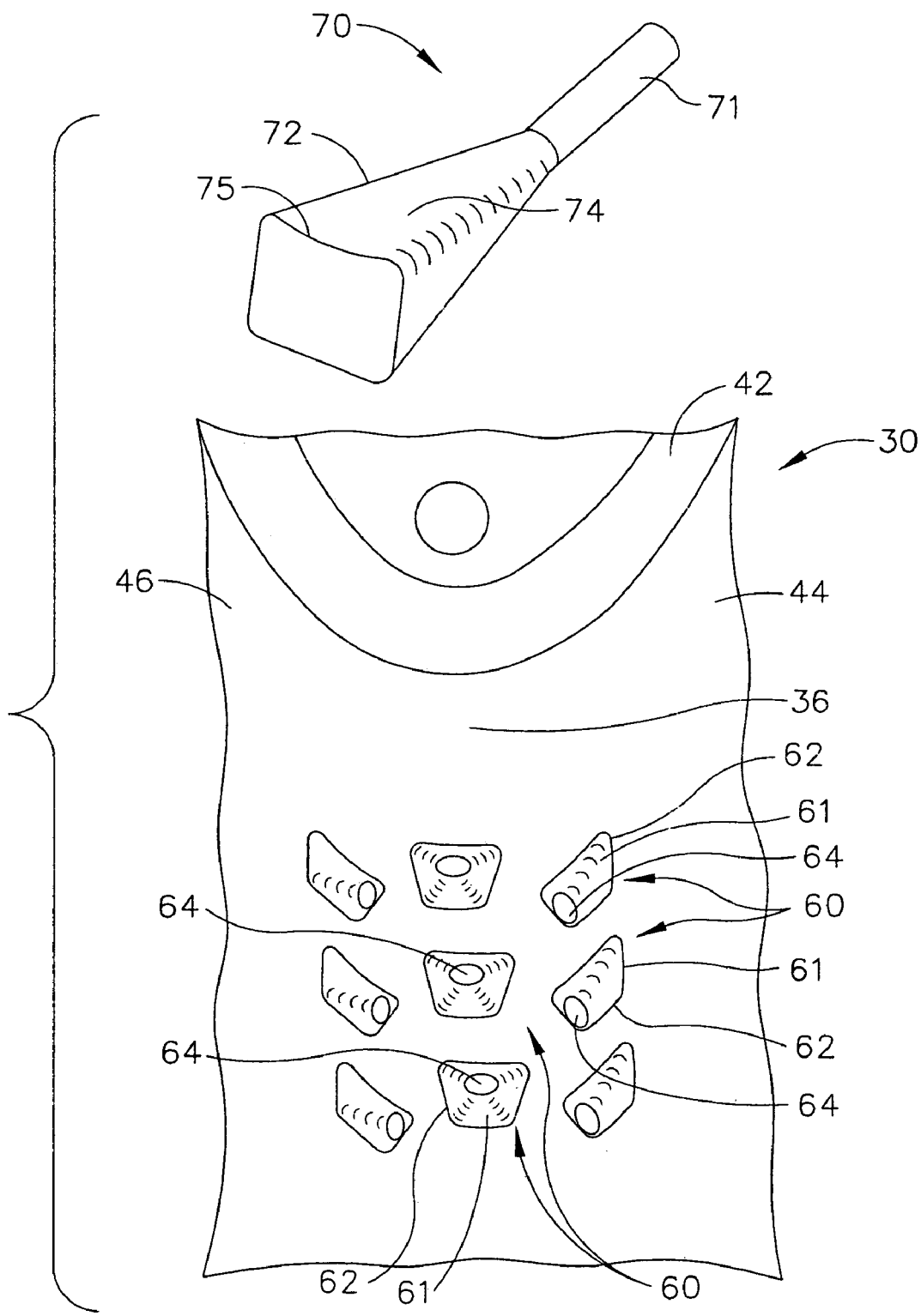
FIG. 6 is a fragmentary perspective view of an upper portion of the leading edge of an airfoil according to an embodiment of the invention, together with a perspective view of an electrode discharge machining tool of a type that may be used to form the cooling holes in the leading edge.

Referring now to FIG. 6, the cooling holes 60 formed in the leading edge 36 along the span axis of the airfoil 32 each include a diffuser section 61. The diffuser section 61 preferably has four opposed walls defining a generally quadralinear exit opening 62 on the surface of the leading edge 36. At least one of the diffuser walls 61 has a convex curvature that approximates the local external surface curvature of the leading edge 36 whereby fluid flow "F" from the cooling hole exits 62 is more evenly dispersed and spread along land portions of the leading edge 36 adjacent the cooling holes 60. Cooling holes in accordance with the present invention may, in a given application, also be formed in other locations on the airfoil that are curved.

Each of the cooling holes 60 also includes a cylindrical metering section 64 positioned between and communicating with the cooling circuit 50 of the airfoil 32 and the diffuser section 61.

Also shown in FIG. 6 is an EDM tool 70, providing one preferred manner of forming the cooling holes 60. Other known methods include laser drilling and conventional machining techniques. The EDM tool 70 represents the "positive" shape that forms a cooling hole 60. The EDM tool 70 has a cylindrical portion 71 that represents and forms the cylindrical metering section 64 of the cooling hole 60, communicating for fluid flow with the cooling circuit 50.

Figure 7:
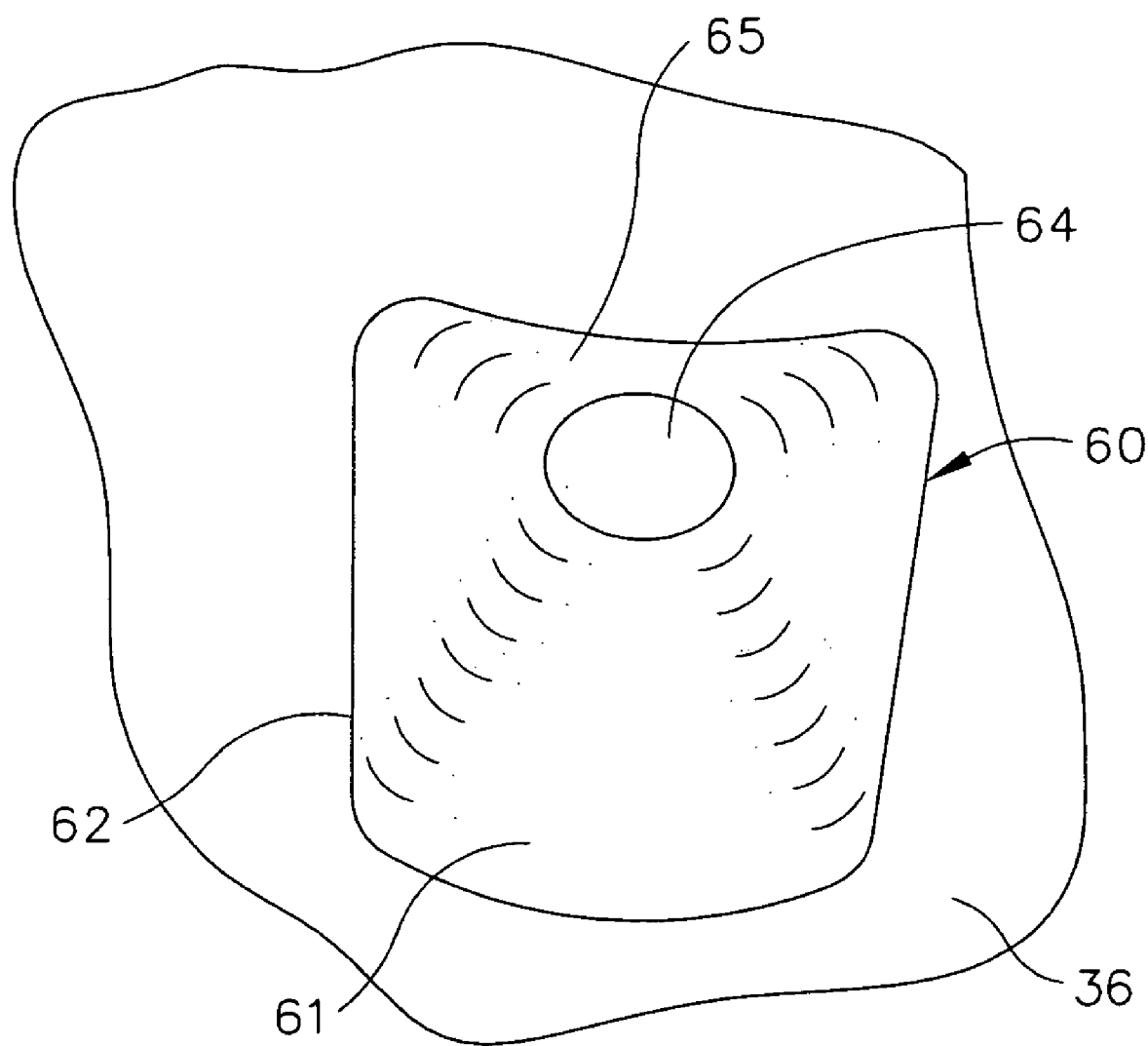
FIG. 7 is a greatly enlarged front elevation of a single fan hole on the leading edge of the airfoil.

A generally pyramidal portion 72 represents and forms the diffuser section 61 of the cooling hole 60, including the exit opening 62. Note particularly the top, laterally-extending surface 74 of the pyramidal portion 72 of the EDM tool 70. The curvature of this surface, best seen at the edge line 75, represents a curvature generally similar to the curvature of the local area of the leading edge 36, i.e., the land area of the leading edge 36 onto which the fluid flow "F" will be discharged in a diffused condition by respective ones of the cooling holes 60. This curvature is formed as a wall 65, see FIG. 7, of the diffuser section 61, and defines a convex curvature complementary to the concave curvature of the top, laterally-extending surface 74 of the EDM tool 70. The degree of curvature of the wall 65 is thus preferably approximately the same as the curvature of the local land area of the leading edge 36.

The spacing and shape of one exemplary embodiment of the cooling holes 60 are shown in FIGS. 8 and 9. Note the staggered array of the holes 60 in FIG. 8, and the acute angle of the top, laterally-extending surface of the diffuser section 61 in relation to the angle of the metering section 64. The diffuser section 61 of each fan hole 60 is angled upwardly about 15 degrees relative to the radial axis of the airfoil 32 for discharging the cooling airflow radially upwardly towards the tip 42 of the airfoil 32.

In one exemplary embodiment of the invention, the cooling holes 60 have an area of 0.45 mm² at the exit opening 62, and the metering section 64 has a diameter of 0.38 mm at its point of convergence with the diffuser section 61. The angle of divergence of the diffuser section 61 from the metering section 64 to the exit opening 62 is 15 degrees. The cooling holes 60 occupy approximately 35 percent of the surface area of the leading edge 36, and the distance between centerlines of vertically adjacent cooling holes 60 is approximately 1.14 mm. The distance between centerlines of laterally adjacent cooling holes 60 is 1.52 mm. Preferably, the exit openings 62 are spaced vertically apart by about 0.76 mm and are spaced laterally apart by about 0.76 mm.

As noted above, the top, laterally-extending surface 74 of the EDM tool 70 in FIG. 6 is concave, and forms the convex wall 65 upon completion of the EDM step described above. Also as noted above, the curvature of the convex wall 65 and the local external surface curvature of the leading edge 36 are approximately the same, whereby fluid flow "F" from the cooling hole exits 62 is evenly dispersed to a greater degree than in prior art diffuser holes, and spreads along land portions of the leading edge 36 adjacent the cooling holes 60. Thus, it is preferable that the curvature of the wall 65 also be approximately 1.52 mm in radius.

In one example, in a circle of 2.5 mm the curvature of the leading edge 36 is covered for about 74 degrees of a circle. The curvature of the convex wall 65 is about the same as the curvature of leading edge 36. In another more broadly-defined example, the curvature of the leading edge 36 is covered for between about 70 and 80 degrees. The curvature of the convex wall 65 is about the same as the curvature of the leading edge 36, i.e., between about 70 and 80 degrees.

As is evident to one of skill in the art, these values will differ according to the size, shape, type and operating conditions of a particular airfoil. Additionally, two or more of the walls of the diffuser section may be provided with a wall curvature optimized for evenly diffusing a cooling fluid film onto the leading edge.

An airfoil with cooling holes for enhanced cooling is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A turbine airfoil having an external surface defining a curvature, comprising:
   (a) a leading edge and an axially spaced-part trailing edge, the leading edge having an axially-extending aerodynamic external surface curvature;
   (b) a root and a tip spaced-apart along a radially-extending span axis;
   (c) a pressure sidewall and a laterally-spaced-apart suction sidewall;
   (d) a cooling circuit positioned between the pressure sidewall and the suction sidewall for channeling a fluid flow for cooling the airfoil;
   (e) a plurality of cooling holes formed in the external surface of the airfoil and disposed in fluid communication with the cooling circuit, each of the plurality of cooling holes having a diffuser section communicating with the external surface, and having opposed walls defining a generally quadralinear exit opening on the external surface, the diffuser section being angled upwardly about 15 degrees relative to the radial axis of the airfoil for discharging the cooling airflow radially upwardly towards the tip of the airfoil; and
   (f) at least one of the diffuserwalls having a convex curvature that approximately matches the external surface curvature of the airfoil local to the cooling hole whereby fluid flow from the fan hole exit Is evenly dispersed and spread along land portions of the external surface of the airfoil adjacent to the cooling holes.

2. A turbine airfoil according to claim 1, wherein the cooling holes each include a respective cylindrical metering section positioned In fluid communication with the cooling circuit of the airfoil and the diffuser section.

3. A turbine airfoil according to claim 2, wherein the diffuser wall having the convex curvature is oriented at about a 15 degree angle relative to cylindrical walls of the metering section.

4. A turbine airfoil according to claim 1, wherein the cooling holes are formed In the leading edge of the airfoil.

5. A turbine airfoil according to claim 1, wherein the quadralinear opening of the diffuser section defines a radially-extending, vertical height dimension and a laterally-extending width dimension, and wherein the exit openings are spaced radially-apart about 1.14 mm.

6. A turbine airfoil according to claim 1, wherein the quadralinear exit opening of the diffuser section defines a radially-extending vertical height dimension and a laterally-extending width dimension, and wherein the exit openings are spaced radially apart by about 1.14 mm and are spaced laterally apart by about 1.14 mm.

7. A turbine airfoil according to claim 6, wherein a center row of the cooling holes is vertically staggered relative to first and second rows positioned on opposing sides of the center row of cooling holes.

8. A turbine airfoil according to claim 1, wherein the leading edge of the airfoil includes three generally radially-extending rows of cooling holes.

9. A turbine airfoil according to claim 1, wherein the surface area coverage of the leading edge by the cooling holes is about 35 percent.

10. A turbine airfoil according to claim 9, wherein the area of the exit opening is about 0.45 mm².

11. A turbine airfoil according to claim 1, wherein the area of each exit opening is between about 0.12 mm² and about 0.65 mm².

12. A turbine airfoil according to claim 1, wherein the curvature of the leading edge is covered by between about 70 to 80 degrees of a circle, and the curvature of the at least one convex diffuser wall is about the same as the curvature of the leading edge.

13. A turbine airfoil, comprising:
   (a) a leading edge and an axially spaced-part trailing edge, the leading edge having an axially-extending external surface curvature;
   (b) a root and a tip spaced-apart along a radially-extending span axis;
   (c) a pressure sidewall and a laterally-spaced-apart suction sidewall;
   (d) a cooling circuit positioned between the pressure sidewall and the suction sidewall for channeling a fluid flow for cooling the airfoil;
   (e) a plurality of cooling holes formed in the leading edge along the span axis of the airfoil in fluid communication with the cooling circuit, at least some of the cooling holes having a diffuser section communicating with the leading edge surface, the diffuser section having opposed walls defining a generally quadralinear exit opening on the surface of the leading edge; and (f) an upper, radially-extending one of the diffuser walls having a convex curvature that approximately matches the external surface curvature of the leading edge whereby fluid flow from the cooling hole exits is evenly dispersed and spread along land portions of the leading edge adjacent the cooling holes, the cooling holes each including a respective cylindrical metering section positioned between and communicating with the interior of the airfoil and the diffuser section and defining a longitudinal axis that diverges from a radius of the leading edge.

14. A turbine airfoil according to claim 13, wherein the diffuser section of each fan hole is angled upwardly about 15 degrees relative to the radial axis of the airfoil for discharging the cooling airflow radially upwardly towards the tip of the airfoil, and further wherein the quadralinear opening of the diffuser section defines a radially-extending height dimension and a laterally-extending width dimension with the exit openings being spaced radially apart about 1.14 mm.

15. A turbine airfoil according to claim 14, wherein walls of the diffuser section are oriented at about a 15 degree angle relative to cylindrical walls of the metering section.

16. A turbine airfoil according to claim 13, wherein the curvature of the leading edge is covered by between about 70 to 80 degrees of a circle, and the curvature of the convex diffuser wall is about the same as the curvature of the leading edge.

17. A turbine airfoil according to claim 13, wherein the quadralinear exit opening of the diffuser section defines a radially-extending height dimension and a laterally-extending width dimension, and wherein the exit openings are spaced radially-apart by about 1.13 mm and are spaced laterally apart by about 1.13 mm.

18. A turbine airfoil according to claim 17, wherein a center row of the cooling holes is radially staggered relative to first and second rows positioned on opposing sides of the center row of cooling holes.

19. A turbine airfoil according to claim 18, wherein the area coverage of the surface of the leading edge by the cooling holes is about 35 percent.

20. A turbine airfoil according to claim 13, wherein the leading edge of the airfoil includes three root-to-tip-extending rows of cooling holes.

21. A turbine airfoil according to claim 13, wherein the area of the exit opening is between about 0.12 mm$^2$ and about 0.65 mm$^2$.

22. A turbine airfoil according to claim 13, wherein the area of the exit opening is about 0.45 mm$^2$.

23. A turbine airfoil according to claim 13 wherein the curvature of the leading edge is covered by between about 70 to 80 degrees of a circle, and the curvature of the at least one convex diffuser wall is about the same as the curvature of the leading edge.

24. A turbine airfoil according to claim 13 wherein the curvature of the leading edge is covered about 74 degrees of a circle, and the curvature of the at least one convex diffuser wall is about the same as the curvature of the leading edge.

* * * * *